United States Patent
Kulkarni

(10) Patent No.: US 9,773,029 B2
(45) Date of Patent: Sep. 26, 2017

(54) GENERATION OF A DATA MODEL

(71) Applicant: International Business Machines Corporation, Armonk, NY (US)

(72) Inventor: Sachin J. Kulkarni, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/988,888

(22) Filed: Jan. 6, 2016

(65) Prior Publication Data

US 2017/0193016 A1 Jul. 6, 2017

(51) Int. Cl.
*G06F 17/30* (2006.01)

(52) U.S. Cl.
CPC .. *G06F 17/30294* (2013.01); *G06F 17/30604* (2013.01)

(58) Field of Classification Search
CPC ................................................. G06F 17/30294
See application file for complete search history.

(56) References Cited

U.S. PATENT DOCUMENTS

| 6,385,618 | B1* | 5/2002 | Ng .............................. G06F 8/30 |
| 7,401,321 | B2 | 7/2008 | Sit et al. |
| 7,716,167 | B2 | 5/2010 | Colossi et al. |
| 2004/0064456 | A1* | 4/2004 | Fong ................. G06F 17/30592 |
| 2015/0074081 | A1 | 3/2015 | Falter et al. |

FOREIGN PATENT DOCUMENTS

WO    WO 02080028 A1 * 10/2002   ....... G06F 17/30427

* cited by examiner

*Primary Examiner* — Apu Mofiz
*Assistant Examiner* — Dara J Glasser
(74) *Attorney, Agent, or Firm* — Winstead, P.C.

(57) ABSTRACT

A method, computer program product and system for building a data model. In response to receiving a plurality of data field(s) as input, a database associated with each of the data fields(s) received is identified. A schema underlying the associated database is ascertained. One or more element(s) for each of the plurality of data fields(s) is identified based on applying the ascertained schema of the associated database(s). A data model is generated utilizing the identified one or more element(s) corresponding to each of the plurality of data field(s) associated to each of the database(s).

14 Claims, 4 Drawing Sheets

GENERATION OF A DATA MODEL

TECHNICAL FIELD

The present invention relates generally to the field of data modelling, and more particularly to generating a data model for data processing in a distributed environment.

BACKGROUND

In practice, data models are used to perform analysis on data stored in a database. Data models provide consumers with a predictable interface for querying a variety of data. Using data models, the data of the database appears as logically organized, depending on the implementation and consumption needs of a user. Historically, the data models have built on a relational database, where data is generally organized as a set of tables. Each table may comprise a set of rows and columns. The data models, as of date, rely upon Structured Query language (SQL) to define, read and manipulate data within such relational databases.

Online analytical processing (OLAP) is one such application tool that processes upon data models to achieve business intelligence. Using the OLAP tools, reports are generated and analysis is performed on data models containing data retrieved from the relational database. The application need only know the logical grouping of data elements (columns in a table) to express questions in the standard query language.

SUMMARY

In one embodiment of the present invention, a method for building a data model comprises in response to receiving a plurality of data field(s) as input, identifying a database associated with each of the data fields(s) received. The method further comprises ascertaining, by a processor, a schema underlying the associated database. The method additionally comprises identifying, by the processor, one or more element(s) for each of the plurality of data fields(s) based on applying the ascertained schema of the associated database(s). Furthermore, the method comprises generating a data model utilizing the identified one or more element(s) corresponding to each of the plurality of data field(s) associated to the database(s).

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
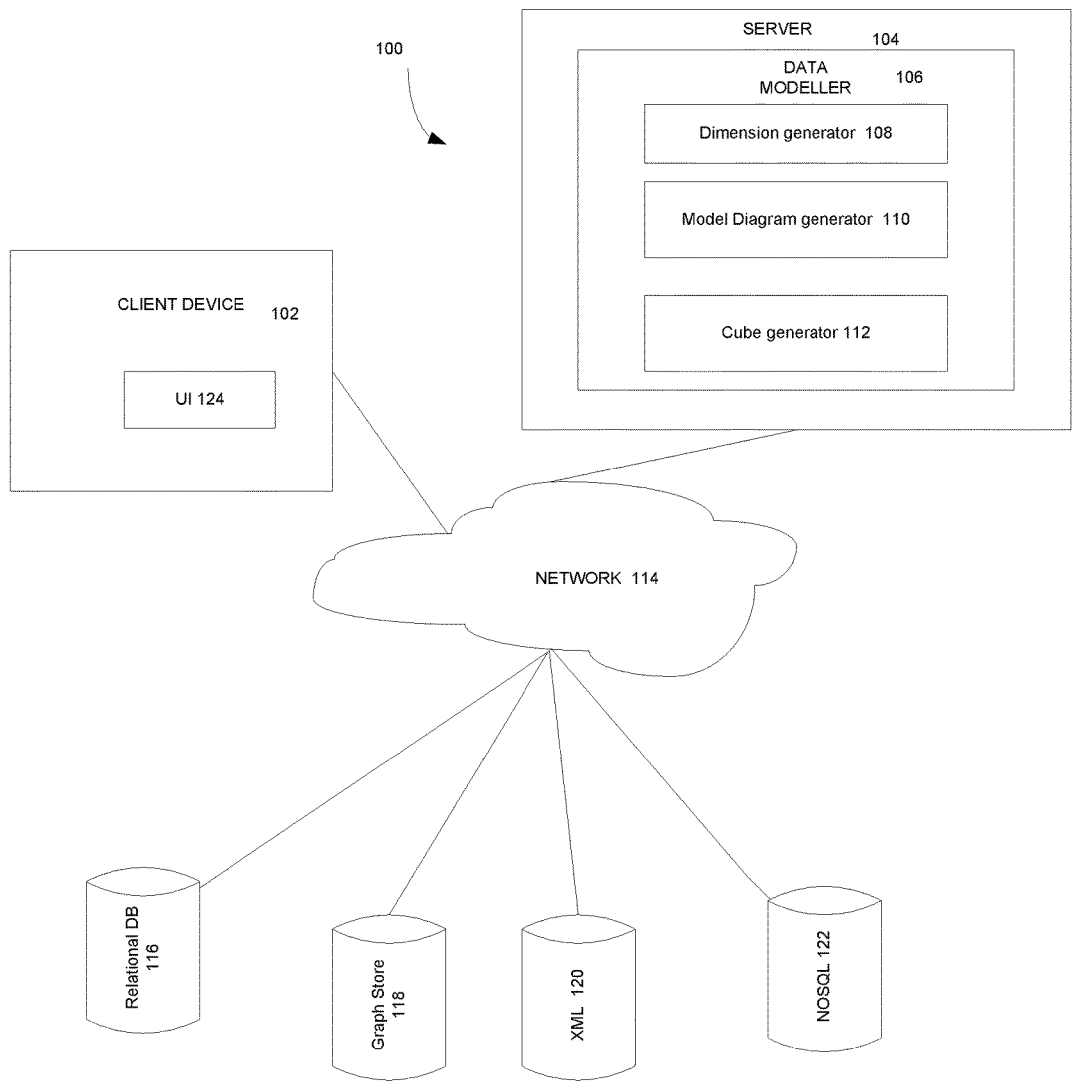
FIG. 1 is a block diagram illustrating a computing environment for generation a data model and/or a cube model in accordance with an embodiment of the present invention.

In the age of big data, traditional databases may not provide requisite performance capabilities. As a result, more and more data storage is now happening in non-relational databases, such as non SQL (NoSQL) databases. NoSQL databases require storage across multiple locations in a distributed environment. Further, multiple storage locations may not be following a fixed schema. As a result, the existing data models have inability to collate data stored across multiple locations in various non-relational databases to perform analytics.

Furthermore, currently the data models do not have the ability to share data stored in stacks, across multiple locations. This leads to sharing of redundant information across several applications for building data models for data processing. This is an additional increase in unnecessary overheads. Therefore, there is a need for a tool which can overcome organization issues of the databases and provide the end user with an ability to perform analytics on data stored in a distributed environment without compromising the performance.

To overcome the organizational issues and to boost business intelligence, there is a need for a system that can provide for logically scaling up the analysis on the data stored across multiple locations without being bothered by the schema of the underlying database. It is desirable to provide an efficient data model that allows for the aggregation of data from several sources, sourced from multiple environments, to enable enhanced visualization of data. There is a need for a data model that can store architecture details of the data sourced from several databases which can be shared across applications. There is also a need for a data model that can enable data loading to happen at the time of performing analytics. This may save on storage needs and doing away with loading of the same data at several locations.

Unlike traditional data modelling which focus on resolving the complexity of relationships among schema-enabled data, data modelling generally breaks in distributed computing systems, such as NoSQL databases. The reason being NoSQL databases do not have a fixed schema, as a result when data is to be collated from several locations, processing breaks in-between.

NoSQL is defined as any database that does not utilize SQL language. NoSQL databases are typically key-value stores that are non-relational, distributed, horizontally scalable and schema free. Currently, storing data into the NoSQL database is much simpler, and quicker. In an example of a NoSQL database system, image files and audio files can be put straight into a same database without altering their structure. It is further interesting to note that different NoSQL databases store data in a different manner. Examples of NoSQL databases include column store, document store, key-value store, graph databases, object oriented databases, XML databases and other multimodel, multidimensional and multivalue databases. Column-oriented NoSQL databases require data organized in rows (tuples). There is no object relational mapping required. Various indexes, caching and other techniques are applied to the query. Also, in document oriented databases while the data is stored in tuples, the format is not rigid. Values are stored together with their key and the structure of rows can be changed in successive rows. Examples of document-oriented databases include CouchDB, MongoDB and orient DB.

Additionally, the data models generally run on one type of database having a fixed schema. In particular, the data model running on NoSQL applications, object databases or cubes, require the data model application to know the physical representation of the data stored across the databases to maintain the integrity of the data. In other words, the data model solutions require knowledge of a data tier that has been optimized for the application at hand. As such, in today's age of big data, where volumes of data are being stored across multiple servers, running a query to retrieve and integrate data for logical analysis is not easily feasible. As a consequence, existing applications cannot achieve fully their desired objective. As quantity and variety of data are growing rapidly, models and tools to process complex queries for data stored across several locations is required. There is a need of a new methodology to manage big data stored in a distributed environment to achieve maximum business value.

There is also a need for a data model which may even be enabled to define, read and interpret data, stacked across different types of databases to suit changing information needs for doing business analytics. There is also a need for a data model that allows to easily read data stacked across multiple locations. There is also a need for a data model which can achieve the above listed objectives without duplication of the same data across databases.

The proposed solution provides a schema free model, which requires that once the data is loaded and updated, business analysts can perform analysis on the underlying data stored across various different types of databases. The present invention is capable of allowing for complex processing of data, like aggregation or filtering efficiently. The method further provides for integrating and transforming the data into an organized structure, and finally delivering the required data to the end users. The proposed solution provides performing logical processing on data stacked in various different types of databases including NoSQL databases, using aspects of online analytical processing. The proposed solution can also be performed on hybrid database systems.

While the embodiments are described with reference to online analytical processing tools, the invention is not intended to be limited to be used alone for online processing to generate cube models in a hybrid database.

In one example, the proposed solution provides embodiments that may enable OLAP processing on aggregations of data stored in a server as dedicated tables. The proposed solution provides for improved storage as it allows caching only chosen data field(s) tables which require less spacing than caching whole tuples of elements and attributes. In one example, to improve performance issues, the proposed solutions provides for storing in in-memory cache. The in-memory cache may be in a database server or an in-memory cache of an application executing on the server. In one embodiment, OLAP processing is capable of being performed on the selected data which is either stored on the server or in in-memory cache. In one embodiment, the present application provides a capability to a user to modify an XML file which may even store data related information in the in-memory cache. In one example, for a NoSQL database, a key from the input data is mapped to the corresponding key-value pairs stored in the database.

Embodiments of the present invention will now be described in detail with reference to FIGS. 1-4. FIG. 1 is a functional block diagram illustrating a data modeling environment for data processing in accordance with an embodiment of the present invention. For example, FIG. 1 is a functional block diagram illustrating data modelling environment 100. Data modelling environment 100 includes a server 104, a client device 102, and one or more databases (116, 118, 120, 122) connected over network 114.

Through the client device 102, a user can send a request to the server 104. The request can be a query which is inputted from the client device 102 to the server 104 to analyze data stored in a database. The stored data is a source database which may include flat files, required for doing data analysis. In one embodiment, the client device 102 may include a client application (not shown) that communicates with the server 104. In one example, the client application intermediates through the server 104 to communicate with one or more databases (116, 118, 120, 122). The received request is processed by the server 104.

In one example embodiment, the client device 102 may submit data related database requests to the server 104 using a standard query language, such as SQL, JSON etc. In one embodiment, the client device 102 includes a user interface (UI) 124 which operates to receive user input from the user via the provided user interface thereby enabling the user to interact with the client device 102. In one embodiment, the UI 124 provides an interface that enables a user of the client device 102 to interact with the server 104 via network 108. In one embodiment, UI 124 may be a part of a client application. The client application may request user input through UI 124 to request and receive desired data from the server 104, and then presenting the received data using the display capabilities of the client device 102 and/or client application (for example, using graphics or spreadsheets).

Based upon processing the inputted request, the server 104 communicates with the one or more databases (116, 118, 120, 122) and returns the results to the client device 102. The client device 102 may include a presentation logic to provide an output comprising data of the underlying database structure in a form desired by a user. The output may be communicated in the form of HTML, CSS and/or JavaScript, or a variety of user interface technologies. In one embodiment, the out can be stored as an XML file or a .txt file or a pivot table. In one example, the output may be a cube model.

In various embodiments, the client device 102 can be a laptop computer, a tablet computer, a netbook computer, a personal computer (PC), a desktop computer, a personal digital assistant (PDA), a smart phone, or any programmable electronic device capable of communicating with computing (server) device 104 via network 114. The client device 102 may include internal and external hardware components as depicted and described in further detail with respect to FIG. 4.

In various embodiments, the server 104 is a device that can be a standalone device, a server, a laptop computer, a tablet computer, a netbook computer, a personal computer (PC), or a desktop computer. In another embodiment, the server 104 represents a computing system utilizing clustered computers and components to act as a single pool of seamless resources. In general, the server 104 can be any computing device or a combination of devices with access to client device 102 and one or more databases (116, 118, 120, 122) and with access to and/or capable of communicatively linked together over the network 114 (e.g., the Internet) allowing processing of data located at several locations, comprising one or more databases. The server 104 may include internal and external hardware components as depicted and described in further detail with respect to FIG. 4.

One or more databases (116, 118, 120, 122) are a data repository to store data that may be written to and read by one or more of the servers 104 and the client device 102. In some embodiments, the databases (116, 118, 120, 122) may be written to and read by programs and entities inside and/or outside of the data modeling environment 100 in order to populate the repository with new data. One or more databases may be stored on disk storage or in one or more accessible memory locations (not shown). In one example, when speed is a key performance metric, the database may be stored in memory, while other databases may be stored on disk storage.

As shown in FIG. 1, there are four different types of databases (116, 118, 120, 122) shown namely, RDBMS 116, graph stores 118, XML 120 and NoSQL 122. The four different types of databases (116, 118, 120, 122) indicate storing of physical data of various types in different formats. In the example, while four different types of databases are shown, application of this invention is not limited to these particular four databases. The invention may include other databases storing data in one or more different formats. Further, for running the present application, there may be a need for more or less number of databases. In one example, there may be one or more databases that have hybrid format. While the databases (116, 118, 120, 122) are not shown to be located in the server in FIG. 1, the one or more of the databases may be located in the server and/or the cloud. Also, each database may have storage across multiple locations in a single server or distributed across several servers.

Network 114 can be, for example, a local area network (LAN), a wide area network (WAN) such as the Internet, or a combination of the two, and may include wired, wireless, fiber optic or any other connection known in the art. In general, the network 114 can be any combination of connections and protocols that will support communications between the server 104, the client device 102, and one or more of the databases (116, 118, 120, 122), in accordance with a desired embodiment of the present invention.

As indicated in FIG. 1, the server 104 includes a data modeler 106. The data modeler 106 is a business intelligence tool that performs the function of assessing data located in the one or more of the databases (116, 118, 120, 122). In one example, the data modeler 106 may be an application layer used to manage the data stored on the one or more databases (116, 118, 120, 122). As a dedicated application running in a server 104, the data modeler 106 is able to natively read the data from the database by using data integration tools. While in FIG. 1, the data modeler 106 is shown as being a component serving on the server 104, yet in another embodiment, the data modeler 106 can be an independent tool located outside of the server 104. In at least one embodiment, the data modeler 106 can be another server communicating with the server 104. The data modeler 106 may include hardware components as depicted and described in further detail with respect to FIG. 4. In one such operation, the data modeler 106 is the application that may run on the client device 102. In another embodiment, the data modeler 106 is the application that runs on the server 104 to communicate with the client device 102. In one embodiment, the data modeler 106 may enable the user to provide information on one or more data field(s).

In one embodiment, the data modeler 106 receives a request generated from the client device 102. In another embodiment, the data modeler 106 may be configured to receive communication either from the server 104 or the client device 102 directly. The communication can be in a form of a query inputted from the client device 102. Input as received at the data modeler 106 is analyzed to determine a specific action to be performed. The action may include retrieving information from one or more of the databases (116, 118, 120, 122). The data modeler 106 may be configured to parse the query and then translate into a map job which is executed on the server 104 for further communication with the one or more databases (116, 118, 120, 122). The map job may require a key to be associated with the input data. In one embodiment, the data modeler 106 may generate a key that may function as a common key corresponding to the query inputted. The key is mapped with the corresponding data information to be tracked and to be fetched from the one or more databases.

The data modeler 106 is enabled to perform one or more of the functions described below. The data modeler 106 may be configured to have a flexibility to determine a schema underlying the database to be traversed. Knowledge of the schema may enable the data modeler 106 to know how that data is structured in the given database for it to operate queries corresponding to the query inputted. In one embodiment, the data modeler 106 may be further configured to do data processing using some procedural language such that it may traverse and process data collection from the one or more databases (116, 118, 120, 122). In one embodiment, the data modeler 106 may be enabled to do data processing based on applying the knowledge of data definition language (DDL) of the underlying database such that it can process different data types stored as video, audio, logs, business tables and so on, in the one or more databases. In few embodiments, the data modeler 10 may be further configured to import data definition language (DDL) specific to each of the databases being traversed. The data modeler 106 may be further enabled to apply the imported DD to retrieve associated data information from one or more of the databases at a later stage. In one embodiment, the data modeler 106 may be configured to traverse through one or more databases either simultaneously and/or in parallel.

In one embodiment, the data modeler 106 is further configured to aggregate retrieved data information from each of the databases traversed. The data modeler 106 may be enabled to use a common key to retrieve the data information pertaining to the query. The data modeler 106 may be enabled to retrieve data information including the plurality of data items from each of the specific databases. The data modeler 106 may be further configured to utilize the common key to aggregate data information corresponding to each of the databases traversed into a group. The data items may include data information on the plurality of data field(s). In one example, the data modeler 106 may be enabled to propose a join topography for the aggregated data information corresponding to each of the databases. The data modeler 106 may be further configured to propose an overall topography covering one or more of the databases traversed in response to the query. The data information being reflected in a topographic view is utilized to generate the data model. In one embodiment, the data modeler 106 may be configured to enable a user to propose another topography over the system generated topography. In some alternate embodiments, the data modeler 106 may be configured to utilize DDL corresponding to one or more databases for the generation of the data model.

The data model is a visual representation on data information that may be used to retrieve data (facts, figures, statistics, etc.) associated with the data information retrieved from one or more databases. The generated data model may include data information, such as data types, associated metadata, and the database organization (e.g., columns, table key-value stores). In one embodiment, the data modeler 106 may be further enabled to enrich the generated data model through the application of annotations. The data modeler 106 may further be configured to define views corresponding to the generated data model.

In one embodiment, the data modeler 106 may be further configured to efficiently traverse through a path which may be stored in the generated data model to read and fetch data. The fetched data may be loaded into a cube model. The cube model allows for multidimensional data processing. In one example, the data modeler 106 may be performed as a platform agnostic tool which can be used by a user for querying and updating data, the data model, data inputs, the cube model and/or data view.

The above described functions of the data modeler 106 may be performed by the data modeler itself. In alternative configurations, the data modeler 106 may have one or more components, such as a dimension generator 108, a model diagram generator 110 and a cube generator 112. Each of these components may have specific functions to perform for better efficiency and speed. These components (i.e., the dimension generator 108, the model diagram generator 110 and the cube generator 112) may further be internal and external hardware components of the data modeler 106.

The dimension generator 108 may determine a fundamental data architecture of the underlying one or more associated databases based on the query received. In some embodiments, the dimension generator 108 may be a device or a component or an application layer within the data modeler 106 that may be designed to interact with the data itself. In one embodiment, the dimension generator 108 may comprise application containers and host languages. The dimension generator 108 may further include a stack of software layers, and/or suitable drivers to be used for data interpretation. The dimension generator 108 may leverage on existing technologies, such as JSON, HTTP, etc. to provide access to and from a variety of applications.

In one embodiment, the dimension generator 108 may receive an input from the data modeler 106. In some examples, the dimension generator 108 may be configured to decompose the received input. In one embodiment, the dimension generator 108 may be configured to analyze the received input. The received input is related to the data information that has to be collated for data processing from one or more databases. The dimension generator 108 may be configured to parse the input and identify the plurality of data field(s) inputted as part of the query. The plurality of data field(s) describe details about the desired output on which the data analysis may get performed. In some embodiments, the data field(s) may describe structured information that reflect on a type of output required. In a few examples, the data field(s) define different blocks of data that are to be created and processed based on data storage, data type, relationships, read-write requirements, and so on. Each of the plurality of data field(s) may be associated with a distinct database; each database may have a different storage type. For example, the data in the database may have been stored in the form of a dimension, a fact, a document, a key-value pair or a graph node. In one example, the data field input may be the numeric facts, which may have been stored in a facts table. The facts table could be the relational database.

The data field(s) may be used to define labelling, grouping and filtering on the plurality of data field(s) for output corresponding to the query inputted.

The input may provide further additional information that can be utilized for retrieving specific data from the given database. In one example, the dimension generator 108 may be further enabled to read an annotation language inputted as part of the query. Annotation language is a user inputted language to define the output regarding the organization of the data and metadata. The dimension generator 108 may be configured to bracket annotation language with other information being received as input.

The dimension generator 108 may for data processing further require generating the key based on the input received. The key is defined as a unique identifier/marker related to the received query. In one embodiment, the dimension generator 108 may integrate the key with each of the data field(s) inputted. There may be one common key used for the one or more data field(s) corresponding to the inputted query. The key may be later utilized for retrieving data for the output. In one example, the key may be used as an index key.

The dimension generator 108 may, based on utilizing the identity of the plurality of data field(s), determine one or more databases that can be associated with the respective data field(s). The dimension generator 108 is configured to recognize the database among the one or more databases (116, 118, 120, 122) that can be associated to the particular data field based on a data storage type. Once the storage type of the data field is known, a database is identified which can be associated with the respective data field. In another example, the dimension generator 108 may be configured to utilize the annotation language to link the annotation language related with the data field(s) to each of the respective identified one or more databases.

The dimension generator 108 may be further configured to ascertain a schema underlying each of the identified databases. The schema provides details related to the underlying data definition language of the database model based upon its type according to which data of the database is organized. Having ascertained the schema underlying the database, the dimension generator 108 may be further configured to import the data definition language of the associated database and may apply the imported data definition language to associate, read and process data stored across the one or more databases (116, 118, 120, 122). In some embodiments, the key may be mapped/associated/integrated for each of the identified data field(s) corresponding to which each of the one or more associated databases that can be tracked and/or traversed.

The dimension generator 108 may be further configured to navigate through the database corresponding to the identified data field(s) to track and map the data field(s) with corresponding data being traversed in the associated database. The dimension generator 108 may be configured based on the selected schema to further select an element that can be associated with the respective data field(s). An element is the information which is built and populated for the selected data field(s). Each of the elements may have a distinct primary key which may be consumed at the backend and used to uniquely identify the element information. In one embodiment, the primary key of the selected element may be associated with the common key associated to each of the selected element(s). In one example, elements do not function as an index key.

The dimension generator 108 may be further configured to identify attributes that are associated with each of the selected elements corresponding to the one or more identified data field(s) associated with each of the databases. The attribute selection is based on mapping a primary key of the selected element in the respective data field. In one embodiment, the dimension generator 108 may be further configured to associate the common key with the identified elements and attributes to enable it to retrieve data from each of the respective associated databases.

The dimension generator 108 may be further configured to capture the path traversed for the selection of the respective elements and associated attributes and link them with the identified plurality of data fields to establish a path for the selected plurality of elements and identified attributes for each of the associated databases. The captured information may be stored as a path expression or link. In one embodiment, the generated key may be mapped to the database traversed and tracked to retrieve the entire link to the data contained in one or more databases. In one example, the link may enable the retrieval of data stored across different containers in the one or more associated databases. Once the link between various data items traversed is captured, the dimension generator 108 may further communicate with the model diagram generator 110 to document the captured information relative to the path traversed.

In some embodiments, the dimension generator 108 may be configured to import the data definition language corresponding one or more data field(s), identified elements and attributes and use the data definition language for each of the one or more databases to pull together data information corresponding to the identified elements and attributes of each of he identified data field(s) as data blocks. Such association built based on the traversal through the database for each of the data field(s) and other data items, such as elements and attributes selected, is then utilized to generate the data model.

The dimension generator 108 may be configured to propose a join topography for each of the data blocks into one group. In some embodiments, the dimension generator 108 may be configured to communicate with the model diagram generator 110, another component of the data modeler 106, to generate a data model.

The data model is built to visualize physical data. The data model gives a whole picture for data to be fetched from one or more databases associated with the received input. The model diagram generator 110 may provide the data model as a data representation format that assists in understanding the original data relationship for each of the databases. In other words, the model diagram generator 110 helps to provide a visual way to manage data resources. In some embodiments, the model diagram generator 110 may be configured to utilize the link for each of the databases traversed to display distribution of data along with relationships corresponding to the query inputted. In one embodiment, the model diagram generator 110 may be configured to present the path traversed in the generated data model. The displayed data block information is the data model generated by the model diagram generator 110. The data model as generated by the model diagram generator 110 may include the following fields in metadata definition, such as region servers, physical location of data storage, data access path that the program can use to access data, data format of the saved data and other attributes needed when the data is used. In one embodiment, metadata may include further information, such as scope of the data the schema function applies to, and the versions of data that the schema function can work for. The model diagram generator 110 may be further enabled to enable a user to modify the information contained in the generated data model by the user device 102. In one embodiment, aggregated data information as generated by the model diagram generator 110 can be reused. This reuse can reduce computing costs.

The model diagram generator 110 may further communicate with the cube model generator 112. The cube model generator 112 may include a computing program that can either view the data fields as provided by the data model, which contains information on various data field(s), including path expressions traversed. In one embodiment, the cube model generator 112 may use the schema underlying the generated data model to retrieve data at runtime while processing. The cube model generator 112 may perform the function of loading data corresponding to the data block (group) based on output requirement provided by either the dimension generator 108 or the model diagram generator 110.

The cube model generator 112 may be configured to analyze the path and apply the schema associated with each of the databases and generate a corresponding code template to aggregate data from the data blocks of each of the associated databases. The data block is the information on the data to be collected and stored. In some embodiments, the cube model generator 112 may utilize the data structure definition of the path traversed of the underlying database to determine how the data is to be retrieved. Based on reading the view, the cube model generator 112 knows where to retrieve the data for loading. In some embodiments, the cube model generator 112 may be further configured to enable data corresponding to each of the identified databases be pulled together. The cube model generator 112 may enable the output to be displayed in a table format. The output from the data block is the physical data defined with metadata on which data analysis can be performed. In one example, the output may be stored in XML format or in cube format.

In one example, a cube model is built using the path expressions and the relationships by the cube model generator 112. The cube model may be loaded with data from the respective databases by the cube model generator 112. In one embodiment, the cube model generator 112 is able to access the physical data directly from the databases (116, 118, 120, 122). In one embodiment, the cube model generator 112 stores the data converted from a star schema in a form of deformalized views and tables.

Once the cube model is generated, and data is loaded, online processing can get performed. For example, when the client sends a request for some cell of the cube to the server 104, the server 104 may include the capability to do online analytical processing. The server 104 may perform appropriate backend operations to compute this request and a result is sent back to the client device 102. In another embodiment, the server 104 may include an OLAP engine (not shown) which may be used to provide insights into the retrieved data.

For data analyses, OLAP operations perform some calculations on the fetched data and bring something back and display it. OLAP driven analysis provides for drilling up, drilling down, slicing and dicing, moving sideways, adding other bits of data and viewing information.

In one example embodiment, the data model is dynamically generated. The dynamic data model works by moving data fields having respective elements, attributes and hierarchy about data into memory (not shown) and by doing extensive caching of links to memory (not shown). In one example, the memory may be the RAM of the server 104 or the data modeler 106. The detail facts of actual data, however, may remain in one of the storage locations. In one example embodiment, in-memory OLAP processing may be deployed. This provides a memory-optimized OLAP technology that makes use of a cache, caches result aggregates in in-memory while maintaining a live connection to a source database. As a result, in-memory OLAP processing may enable better support, interactive analysis and reporting over bigger volumes of data. The present invention provides using in-memory more intelligently, keeping frequently accessed items, such as data field(s), elements and attributes, aggregates in memory and building dynamic caches of different types based on the usage pattern of users.

In one example, an in-memory OLAP cube, generated through the cube model generator 112, can be used by the query initiated through the OLAP gestures of a user analysis. In such situations, answers to the user query are retrieved from the OLAP cube's in-memory cache, if possible. If not, the data model 106 may post queries to the one or more databases and store the path to the responses. Over time, the data modeler 106 will be able to answer a majority of queries from cache without querying the source databases.

Figure 2:
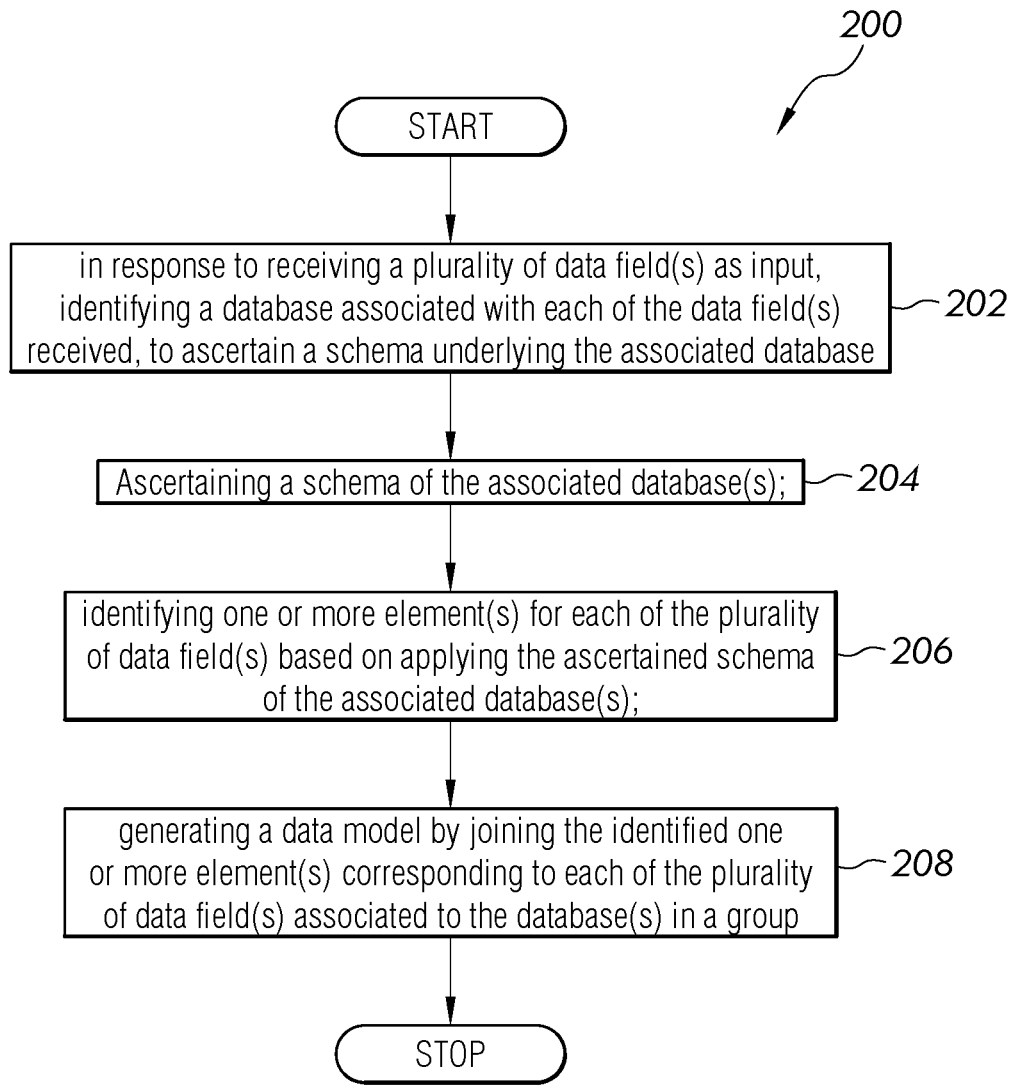
FIG. 2 is a flowchart depicting operations for generation a data model on a computing device within the computing environment of FIG. 1 in accordance with an embodiment of the present invention.

FIG. 2 is a flowchart depicting operations for process of data modelling on a computing device within the computing environment of FIG. 1 in accordance with an embodiment of the present invention. For example, FIG. 2 is a flowchart depicting data modelling operations 200 for the client device 102 within the computing environment 100. The method for generating the data model, the method comprising the following steps: at step 202, in response to receiving a plurality of data field(s) as input, identifying a database associated with each of the data fields(s) received; at step 204, ascertaining a schema underlying the associated database; at step 206, identifying one or more element(s) for each of the plurality of data fields(s) based on applying the ascertained schema of the associated database(s); and at step 208, generating a data model utilizing the identified one or more element(s) corresponding to each of the plurality of data field(s) associated to the database(s).

In step 202, a query initiated by a user at the client device 102 is received. The inputted query determines an action to be performed. In one such example, the details of the input are parsed. If there is missing information, a user is allowed to edit the input through the UI 124 of the client device 102. The query input includes information on a plurality of the data field(s). The data field(s) may provide information such as, location of one or more tables in the one or more databases that may be traversed for fetching requisite stored data information. In some examples, input may be clubbed further to the user provided annotation language, which is also deciphered for processing. The clubbing of annotation language with the plurality of data field(s) may be used to understand output format.

In one embodiment, where it is determined that the query pertains to the data processing, each of the data field(s) as inputted in the query is identified. The data field(s) may include information on the type of data, such as whether the data is stored as dimensions or key-value information or any other information. In one example, the data field comprises either one of a dimension, a key-value pair, a graph node, as one of the type of data input required. The identification of the type of data enables configuring a corresponding database which can be associated with the respective data field. Based on the type of data field, a storage type of the data is automatically configured and a database corresponding to the storage type, for each of the data field(s) is identified and associated with the respective data field(s). For example, if the data field information describes one or more dimensions to be used, a relational database may correspondingly be identified to the data field (dimension inputted). When the input of the data field is in the form of key-value stores, a corresponding type of the non-relational database may get associated.

In one example, to maintain a unique identity of each of the plurality of identified data field(s), a key is associated to each of the identified plurality of the data field(s). The key may be utilized as a common key for identification of each of the plurality of the data field(s). The key may be further integrated with each of the identified one or more database(s) associated with respective data field(s). The unique key may be utilized as a unique identifier for data processing at later stage. The unique key may be stored as part of the query.

In step 204, once each of the respective one or more databases corresponding to the plurality of data field(s) is identified and respectively associated, the system is further configured to intelligently figure out a schema underlying each of the associated one or more databases. The schema defines the manner of construction of the databases. The schema may be stored internally. Once the identified schema underlying each of the databases is identified, characteristics of the underlying database can be analyzed. In one example, specific drivers can be deployed to build an association with the respective database to enable the traversal through the respective database. In other embodiments, data definition language of each of the respective databases(s) is determined.

In step 206, after the schema is applied to the database, the database can be spanned to figure out relevant data to be used for data processing. The database is traversed to deconstruct and identify one or more tables that may be related to the identified data field(s) associated with the database. The one or more tables in the database corresponding to each of the identified data field(s) may then be associated with the respective identified plurality of data field(s). The tables may contain related data information from which data is to be exported. The tables being identified on traversal may be marked in one example. The marking may enable retrieval at a later stage. In one embodiment, information, such as date or order, in which data is to be retrieved from the respective tables is identified in each of the databases, and may be configured from the input for selective selection of the one or more tables.

One or more identified tables are then further treaded to identify elements that can be populated corresponding to each of the data field(s). In one embodiment, the plurality of elements is selected based on inputs provided for each of the data field(s). Based on the inputs, the plurality of elements are identified and associated with the identified data field(s). In one example, the association between the selected elements and the data field(s) can be built by associating the common key with the respective selected plurality of elements. In one embodiment, the common key may be integrated with a corresponding primary key of the selected element.

Further to the selection of the plurality of elements, based on the data field(s), the database is further traversed to automatically identify one or more attributes related with each of the selected elements in the respective database(s). The attributes provide further in-depth properties of the each of the elements. In one embodiment, the attribute may be selected based on mapping the primary key of the selected element in the respective data field to the related attributes. In one embodiment, the common key may be associated to the plurality of identified attributes corresponding to the selected elements in each of the databases traversed. In one example, the system may be enabled to selectively de-select one or more of the related attributes corresponding to each of the selected elements.

In one embodiment, after the selection of the plurality of elements, attributes, corresponding to each of the data field(s) in the respective databases is done, the data definition language (DDL) corresponding to each of the paths traversed in the one or more databases is imported by the system. The system may store the corresponding DDL for each of the databases traversed and store it in the database to utilize the same for retrieval of data. In other words, the path expressions/links (details) of the route traversed in the respective associated one or more databases are saved. In one embodiment, the path to the respective the data field(s) dimensions of each of the identified databases may be stored in a physical table for later view and for editing.

At step 208, a relationship of the selected plurality of elements, corresponding attributes for each of the identified data field(s) in the corresponding database is generated. The relationship in one example is displayed as a group. In one embodiment, a joining topography for selected relationship is suggested. A data model is built using the proposed topography. The data model represents a pictorial view of the join topography of the elements in the group corresponding to the identified data field(s). In one embodiment, the pictorial representation of elements and attributes relationship corresponding to the identified data field(s) is shown based on the paths traversed. In one embodiment, the resulting data model may comprise a view of data field(s) gathered from one or more databases collectively in response to the query. In one embodiment, the path traversed for the respective one or more elements corresponding to the data field(s) in the one or more databases may be additionally displayed in the generated data model. The pictorial representation may include servers (name, IP address, etc.), databases involved, schema information, tables and their join criteria.

In one example, the generated pictorial view of the data model may be stored in a database (not shown). In one embodiment, the generated pictorial view may be stored in the in-memory cache of the server 104 or the data modeler 106 itself. In one embodiment, a user of the client device 102 may be enabled to modify or edit the displayed data information view in the generated data model. The changes or modifications made to the data model by the user of the client device 102 may be received and updated. The selective database associated with the modifications may be additionally traversed. In one example, the modifications to any of the identified data field(s), selected elements and the corresponding attributes, in the one or more associated databases may be utilized to either regenerate the existing data model or generate the new data model. In one embodiment, the path as contained in the data model is utilized to fetch the data from the one or more databases traversed to build the cube model when required. In other examples, the common key may be utilized to determine the path traversed. In one embodiment, the cube model is loaded corresponding to each of the identified one or more element(s) by obtaining data from the respective associated database(s) by applying the schema underlying the respective database associated to the identified one or more element(s).

The cube model is one example of loaded data utilized for doing data processing. The cube model enables a multiple dimensional view of the loaded data for analysis or dissection of data. The cube model can be built on the fly utilizing the already generated data model. The cube model is configured to include data in real time. The resulting cube model containing the selected data may be provided to the client device 102. The user at the client device 102 may be enabled to perform online analytical processing on the cube model received at the client device 102. The cube model enables selective processing. The cube model may be stored in the in-memory cache or in the database or partly in the in-memory cache and other storage means.

The above embodiments and implementations may combine together and cross-reference thereby resulting in one or more embodiments.

Figure 3:
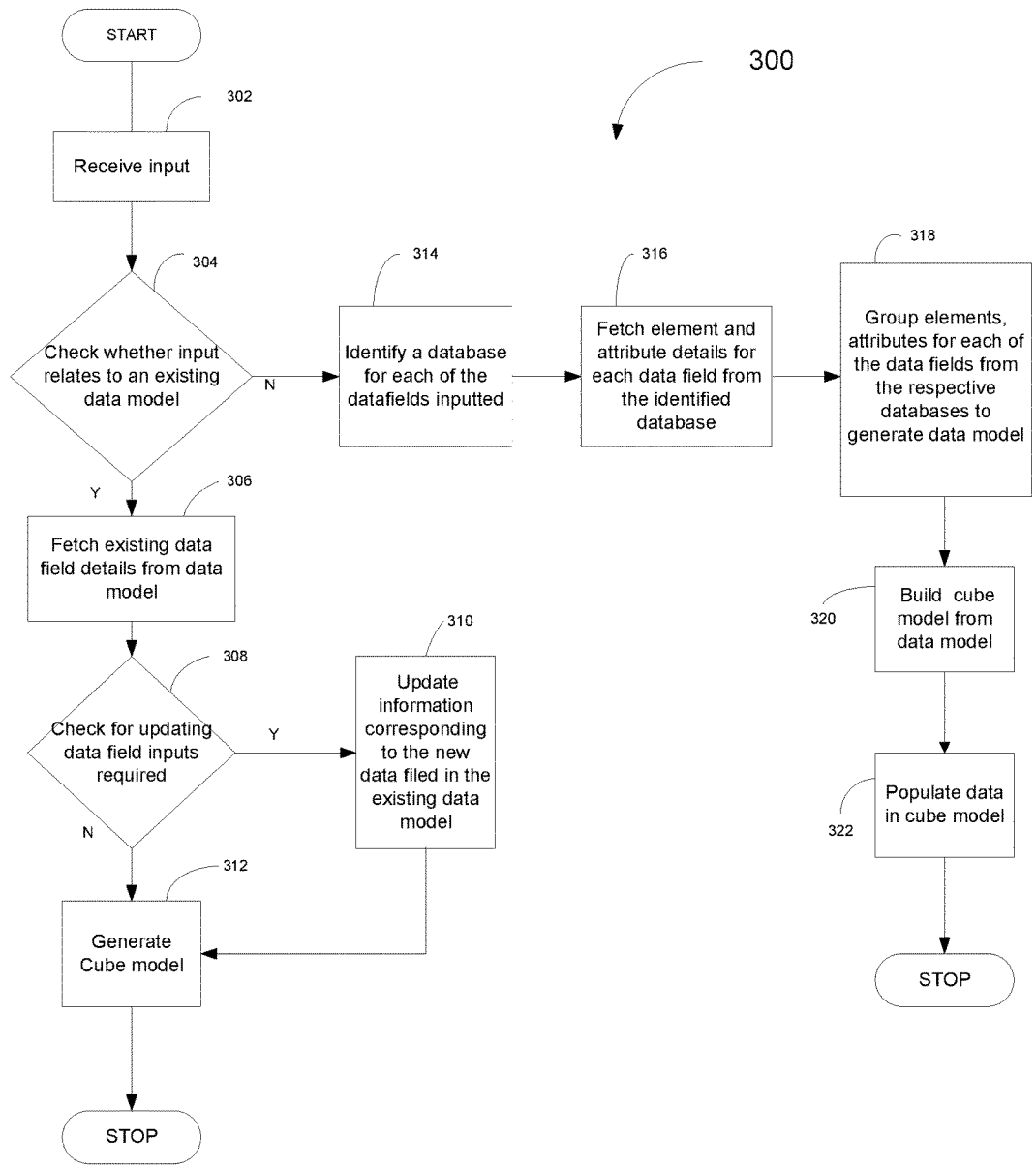
FIG. 3 is a flowchart depicting operations of an example implementation up to building of a cube model by utilizing a data model as a template on a computing device within the computing environment of FIG. 1 in accordance with an embodiment of the present invention.

FIG. 3 is a flowchart depicting operations for generating a cube model on a computing device within the computing environment of FIG. 1 in accordance with an embodiment of the present invention. For example, FIG. 3 is a flowchart depicting operations 300 of the data modeler 106 on the server 104 within computing environment 100.

At step 302: a query is received as an input. In one example, the query is received by the server 104 or the data modeler 106. The received query as inputted is parsed to determine the type of query. The server 104 determines whether the query pertains to processing on a data model. When the server 104 determines that the query relates to the data model, the server 104 may communicate with the data modeler 106 to take further action on the query.

At decision 304: the data modeler 106 is configured to parse the query to ascertain the function to be performed. Once the data modeler 106 determines that the query pertains to performing online analytical processing, the data modeler 106 further checks whether the query may be performed to an already generated data model or a new data model is to be generated. When the data modeler 106 determines that the query pertains to an existing data model, the data modeler 106 follows Yes Branch 306, and when it is determined by the data modeler 106 that the query requires generation of a new data model, the data modeler 106 follows No Branch 314.

At step 306: the data modeler 106 retrieves an existing data model. The data modeler 106, may in one example, retrieve the data model saved in the in-memory cache of either the data modeler 106 or the server 104. The data modeler 106 may be enabled to fetch the details regarding data information as stored in the data model and compare it with the query inputted in the plurality of data field(s).

At decision 308: the data modeler 106 is configured to compare each of the data field(s) as stored in the existing data model with new data field(s) as inputted in the query corresponding to each of the associated one or more databases. If the data modeler 106 determines that there are no changes in the new query request inputted, the data modeler moves to No Branch 312 and when data modeler 106 determines that there are some changes to be made to the existing data model corresponding to the plurality of data field(s), the data modeler moves to Yes branch 310.

At step 310: when data modeler 106 determines that there are some modifications to the selected data field(s) inputted, the data modeler 106 may proceed to process data, corresponding to the newly identified data field(s) and the correspondingly identified associated databases and then, based on traversing through the database, accordingly, update the retrieved data information to be stored in the data model with the new changes. The data modeler 106 is further configured to move to step 312 to generate a cube model and perform data loading to the cube model for doing online analytics on the fetched data.

At step 312: the data modeler 106 is configured to import data definition language corresponding to the path traversed and stored in the data model and apply it to identify the tables in the associated one or more of the databases and fetch data from each of the tables using aggregate metrics for building the cube model and then doing some calculations and bringing something back for display at the client device 102. In one embodiment, the data modeler 106 may apply the common key to retrieve data from the associated one or more databases.

At step 314: the data modeler 106 is configured to perform the steps for generation of the data model based on identifying the database(s) associated with the respective data fields inputted. The data modeler 106 is configured to apply the schema underlying the associated database for traversal through the database.

At step 316: the data modeler 106 is further configured to traverse through each of the identified database(s) associated with the respective data field to select one or more of the elements. The data modeler 106 is further configured to identify corresponding attributes related with each of the selected elements based on the primary key associated with each of the selected plurality of elements.

At step 318: the data modeler 106 is configured to group the selected elements, attributes corresponding to each of the data field(s) for each of the databases traversed to generate a data model based on grouping the selected information together. The generated data model is the pictorial representation of the selected data information from the databases traversed in response to the query inputted. In one embodiment, the data modeler 106 may use a common key to group the selected information together. The generated data model is a viewable representation of the data to be retrieved from multiple locations of the identified one or more databases, the databases may represent a distributed environment.

At step 320: the data modeler 106 is configured to build a cube model using the generated data model. The data modeler 106 may use the stored information pertaining to the details of the identified data fields and using the associated common key, import the data definition language of the respective databases to fetch data. The cube model is loaded corresponding to each of the identified one or more element(s) by obtaining data from the respective associated database(s) by applying the schema underlying the respective database associated to the identified one or more element(s).

At step 322: the data modeler 106 is configured to load data into the cube model based on the traversing through the link/path as stored in the data model or otherwise traversed. Once the data is loaded in the cube format, online analytical data processing can be executed. The results of the data processing may be displayed at the client device 102.

While the data format in the form of cube mode is explained for online processing, the invention may be used for other types of data displays and data processing.

The various embodiments implementing the method have been described with respect to accompanying drawings. Those skilled in the art may understand that the method may be implemented in software, hardware or combinations of software and hardware. Moreover, those skilled in art may understand that by implementing various steps of the above method in software, hardware or combinations of software and hardware, there may be provided an environment 10 in which example embodiments of the inventive subject matter may be practiced as shown.

Figure 4:
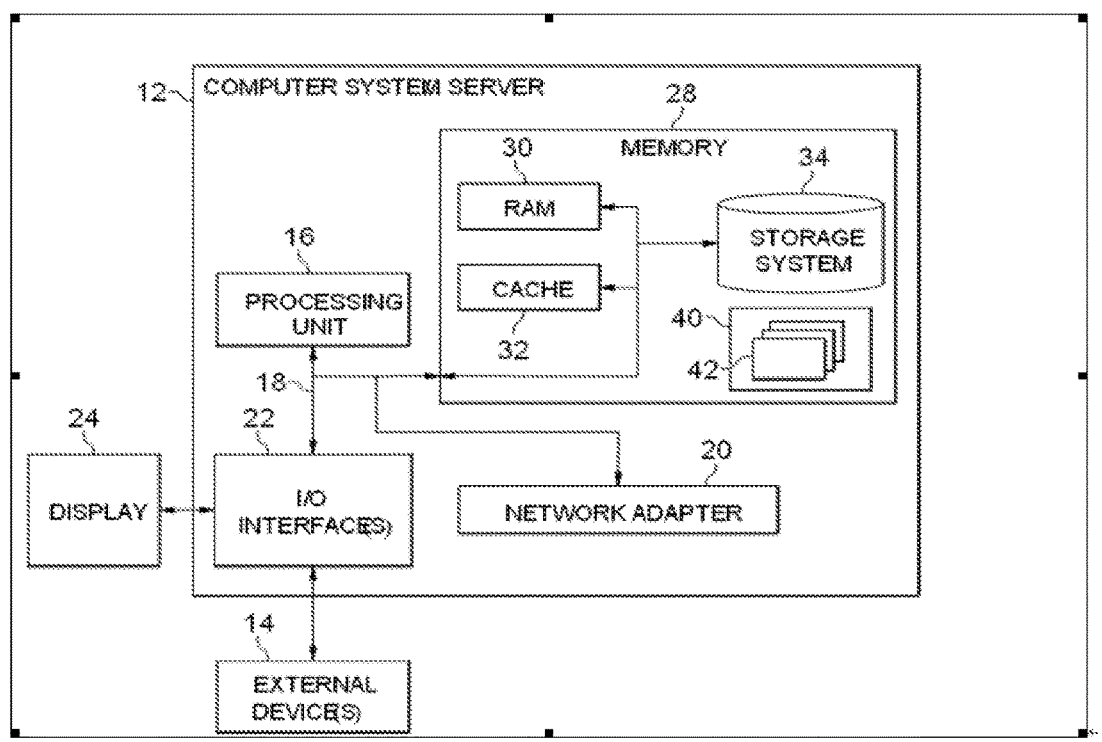
FIG. 4 is a functional block diagram illustrating a computing environment in accordance with an embodiment of the present invention.

Referring now to FIG. 4, in which a block diagram of an exemplary computer system/server 12 which is applicable to implement the embodiments of the present invention is shown. Computer system/server 12 shown in FIG. 4 is only illustrative and is not intended to suggest any limitation as to the scope of use or functionality of embodiments of the invention described herein.

As shown in FIG. 4, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some preferable embodiments will be described in more detail with a reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The invention claimed is:

1. A method for building a data model, the method comprising:
   in response to receiving a plurality of data fields as input, identifying one or more databases associated with each of the data fields received;
   ascertaining, by a processor, a schema underlying the one or more associated databases;
   identifying, by said processor, one or more elements for each of the plurality of data fields based on applying the ascertained schema of the associated one or more databases, wherein each of said one or more elements is information which is built and populated for a selected one or more data fields;
   generating the data model utilizing the identified one or more elements corresponding to each of the plurality of data fields associated to the one or more databases, wherein the data model is a visual representation on data information comprising data types, associated metadata and database organization, that is used to retrieve data associated with data information retrieved from the one or more databases; and
   selecting one or more attributes by utilizing the identified one or more elements associated to the one or more databases, the one or more attributes selected based on mapping a primary key of an identified element with a respective data field;
   wherein the generated data model displays a grouping topography of the identified one or more elements, a group representing a mapping of the respective one or more elements to the selected one or more attributes and the corresponding one or more data fields, associated to the respective one or more databases.

2. The method as recited in claim 1, wherein the plurality of data fields comprise a dimension, a document, a key-value pair or a graph node as one of a type of a data field being inputted.

3. The method as recited in claim 1, wherein the generated data model includes a path to the respective one or more elements corresponding to the one or more data fields in the respective one or more databases.

4. The method as recited in claim 1 further comprising:
   building a cube model using the identified one or more elements from the generated data model.

5. The method as recited in claim 4 further comprising:
   loading the cube model corresponding to each of the identified one or more elements by obtaining data from the respective associated one or more databases by applying the schema underlying the respective database associated to the identified one or more elements.

6. The method as recited in claim 1 further comprising:
   updating the data model based on the input being modified.

7. A computer program product for building a data model, the computer program product comprising a computer readable storage medium having program code embodied therewith, the program code comprising the programming instructions for:
   in response to receiving a plurality of data fields as input, identifying one or more databases associated with each of the data fields received;
   ascertaining a schema underlying the one or more associated databases;
   identifying one or more elements for each of the plurality of data fields based on applying the ascertained schema of the associated one or more databases, wherein each of said one or more elements is information which is built and populated for a selected one or more data fields;
   generating the data model utilizing the identified one or more elements corresponding to each of the plurality of data fields associated to the one or more databases, wherein the data model is a visual representation on data information comprising data types, associated metadata and database organization, that is used to retrieve data associated with data information retrieved from the one or more databases; and
   selecting one or more attributes by utilizing the identified one or more elements associated to the one or more databases, the one or more attributes selected based on mapping a primary key of an identified element with a respective data field;
   wherein the generated data model displays a grouping topography of the identified one or more elements, a group representing a mapping of the respective one or more elements to the selected one or more attributes and the corresponding one or more data fields, associated to the respective one or more databases.

8. The computer program product as recited in claim 7, wherein the plurality of data fields comprise a dimension, a document, a key-value pair or a graph node as one of a type of a data field being inputted.

9. The computer program product as recited in claim 7, wherein the generated data model includes a path to the respective one or more elements corresponding to the one or more data fields in the respective one or more databases.

10. The computer program product as recited in claim 7, wherein the program code further comprises the programming instructions for:
    building a cube model using the identified one or more elements from the generated data model.

11. The computer program product as recited in claim 10, wherein the program code further comprises the programming instructions for:
    loading the cube model corresponding to each of the identified one or more elements by obtaining data from the respective associated one or more databases by applying the schema underlying the respective database associated to the identified one or more elements.

12. The computer program product as recited in claim 7, wherein the program code further comprises the programming instructions for:
   updating the data model based on the input being modified.

13. A system, comprising:
   a memory unit for storing a computer program for building a data model; and
   a processor coupled to the memory unit, wherein the processor is configured to execute the program instructions of the computer program comprising:
      in response to receiving a plurality of data fields as input, identifying one or more databases associated with each of the data fields received;
      ascertaining a schema underlying the one or more associated databases;
      identifying one or more elements for each of the plurality of data fields based on applying the ascertained schema of the associated one or more databases, wherein each of said one or more elements is information which is built and populated for a selected one or more data fields;
      generating the data model utilizing the identified one or more elements corresponding to each of the plurality of data fields associated to the one or more databases, wherein the data model is a visual representation on data information comprising data types, associated metadata and database organization, that is used to retrieve data associated with data information retrieved from the one or more databases; and
      selecting one or more attributes by utilizing the identified one or more elements associated to the one or more databases, the one or more attributes selected based on mapping a primary key of an identified element with a respective data field;
   wherein the generated data model displays a grouping topography of the identified one or more elements, a group representing a mapping of the respective one or more elements to the selected one or more attributes and the corresponding one or more data fields, associated to the respective one or more databases.

14. The system as recited in claim 13, wherein the plurality of data fields comprise a dimension, a document, a key-value pair or a graph node as one of a type of a data field being inputted.

* * * * *